J. E. CANNING.
TOOTH REGULATOR.
APPLICATION FILED MAR. 14, 1916.

1,202,799.

Patented Oct. 31, 1916.

Witnesses
Otto E. Hodduck
John B. Cade

Inventor
John E. Canning
By
Attorney

UNITED STATES PATENT OFFICE.

JOHN E. CANNING, OF DENVER, COLORADO.

TOOTH-REGULATOR.

1,202,799.                 Specification of Letters Patent.        Patented Oct. 31, 1916.

Application filed March 14, 1916.  Serial No. 84,057.

*To all whom it may concern:*

Be it known that I, JOHN E. CANNING, a citizen of the United States, residing at the city and county of Denver and State of Colorado, have invented certain new and useful Improvements in Tooth-Regulators; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in tooth regulators or devices employed by orthodontists in the practice of their profession which is the straightening of teeth or bringing abnormally located or arranged teeth, into normal relation or condition with reference to the other teeth.

In my present improvement I employ an exteriorly threaded spring arch adapted to coöperate with hollow bolts each of which passes through the two sleeves of the anchor band, the bolt being threaded in one sleeve and loose in the other sleeve, though the bolt so far as the sleeves of the anchor band are concerned, may coöperate therewith in any suitable, convenient or practicable manner.

The novelty of my present improvement relates more particularly to the location of a nut in the head or forward extremity of the bolt, the nut being swiveled or journaled in the head of the bolt and threaded interiorly to coöperate with the exterior threads of the arch, the nut being adjustable for the purpose of shortening or lengthening the arch, which protrudes into and moves freely in the hollow bolt, during such adjustment.

Having briefly outlined my improvement, I will proceed to describe the same in detail, reference being made to the accompanying drawing, in which is illustrated an embodiment thereof.

Figure 1:
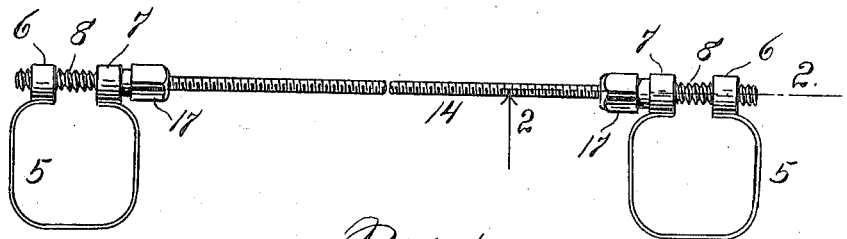
Figure 2:
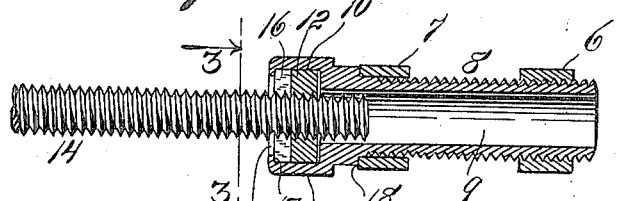
Figure 3:
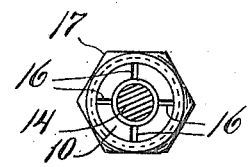
Figure 4:
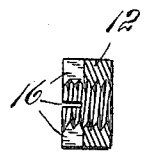
Figure 5:
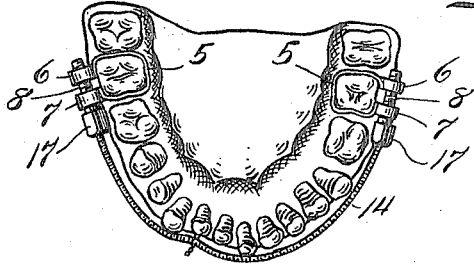

In this drawing, Figure 1 is a view of a tooth regulating device showing two anchor bands, an exteriorly threaded arch, and bolts passing through the sleeves of the anchor band and equipped with my improvement. Fig. 2 is a longitudinal section taken through one of these bolts and the sleeves of the corresponding anchor band, the coöperating portion of the arch being shown in elevation. This view is a section taken on the line 2—2, Fig. 1, shown on a larger scale. Fig. 3 is a section taken on the line 3—3, Fig. 2, showing the nut extremity of the bolt in end elevation. Fig. 4 is a sectional detail view of the nut. Fig. 5 is a view showing a tooth regulating device applied to a set of teeth, the said device being equipped with my improvement. This view is on a smaller scale than Fig. 1.

Let the numeral 5 designate each of two anchor bands equipped with sleeves 6 and 7 and coöperating with a bolt 8 which is threaded into the sleeve 6 and slides freely through the sleeve 7. Each bolt 8 is hollow as shown at 9 and is open at both ends, its forward extremity being counterbored as shown at 10 to receive a nut 12 which is swiveled or journaled therein, its rear surface engaging a shoulder 11 formed by the counterbore, while its outer surface engages an interiorly projecting flange 13 which while relatively narrow, is still of sufficient magnitude to retain the nut 12 within its counterbored cavity and prevent it from traveling in either direction on the exteriorly threaded arch 14 which coöperates with the interiorly threaded opening of the nut. Flange 13 is formed after the nut is placed in the counter-bore of the bolt. This nut is provided on its partially exposed face adjacent the opening 15 with radial recesses or slots 16, there being preferably four of these slots which are arranged in pairs whose individual slots are diametrically located, and, therefore, adapted to receive the operating extremities of the two arms of a bifurcated wrench or manipulating device, whereby the nut may be rotatably adjusted within the cavity of the bolt at the will of the operator. By rotating this nut, it is evident that the arch 14 may be moved into or out of the hollow bolt as may be required or as may be deemed necessary by the operator.

Each anchor band may be adjusted upon the tooth, by rotating the bolt which is provided with a head 17 which is preferably exteriorly polygonal in cross section, to facilitate its manipulation by the use of a wrench or other suitable device. In the rear of the head, the bolt is shouldered as shown at 18, to engage the sleeve 7 of the anchor band, so that when tightening the anchor band upon the tooth, the bolt 8 may be rotated to cause the sleeve 6 to travel toward the sleeve 7 while the latter is held in the same relative position on the bolt. It will thus be observed that the anchor bands may be adjusted on the teeth by turning the bolt, while the arch may be adjusted with reference to the bolts by turning one or both of the nuts 12 as may be required or as may be deemed preferable.

Having thus described my invention, what I claim is,—

1. A tooth regulator including a hollow anchor band bolt and a swiveled nut arranged within the hollow of the bolt for adjusting the arch.

2. A hollow anchor band bolt counterbored at one extremity to receive a nut, one side of which engages the shoulder of the counterbore, the bolt having an interiorly protruding flange in front which the opposite side of the nut engages.

3. A hollow anchor band bolt having an exteriorly threaded portion and a head shaped to facilitate adjustment and carrying a swiveled nut threaded for the adjustment of the arch, the bolt head having a shoulder adapted to engage one of the sleeves of the anchor band.

4. A hollow anchor band bolt having a nut swiveled therein and inclosed thereby at one extremity which is open to permit access to the bolt for arch adjusting purposes.

In testimony whereof I affix my signature, in presence of two witnesses.

JOHN E. CANNING.

Witnesses:
 GRACE HUSTON,
 A. EBERT O'BRIEN.

Copies of this patent may be obtained for five cents each, by addressing the "Commissioner of Patents, Washington, D. C."